United States Patent [19]

Heimerl

[11] Patent Number: 4,528,014

[45] Date of Patent: Jul. 9, 1985

[54] DEVICE FOR THE PRODUCTION OF GLASS DROPS FROM A GLASS MELT CONTAINING RADIOACTIVE WASTE

[75] Inventor: Wilfried C. Heimerl, Mol, Belgium

[73] Assignee: Deutsche Gesellschaft fur Wiederaufarbeitung von Kernbrennstoffen mbH, Fed. Rep. of Germany

[21] Appl. No.: 438,324

[22] Filed: Nov. 1, 1982

[30] Foreign Application Priority Data

Nov. 19, 1981 [DE] Fed. Rep. of Germany ....... 3145785

[51] Int. Cl.³ .............................................. C03B 19/10
[52] U.S. Cl. ....................................... 65/142; 65/21.3; 65/333
[58] Field of Search ...................... 65/21.1, 21.3, 141, 65/142, 333

[56] References Cited

U.S. PATENT DOCUMENTS 3,148,045  9/1964  Schott ................................. 65/21.3
3,271,125  9/1966  Lipp ................................ 65/333 X Primary Examiner—Arthur Kellogg
Attorney, Agent, or Firm—Allegretti, Newitt, Witcoff & McAndrews, Ltd.

[57] ABSTRACT

A device is described for the production of glass drops from a glass melt contained in a melting furnace and containing radioactive waste. The device comprises a horizontally extending pipe adapted at one end to be connected to the melting furnace so as to serve as glass melt overflow. The other end of the pipe is formed with a pocket-like extension, in the base of which the drip nozzles are arranged. The overflow tube, together with pocket-like extension, is surrounded by a heating device and by an insulated housing. The pipe is connected to a bore in the wall of the melting furnace, and the device is simple to manufacture and install.

9 Claims, 3 Drawing Figures

DEVICE FOR THE PRODUCTION OF GLASS DROPS FROM A GLASS MELT CONTAINING RADIOACTIVE WASTE

This invention relates to a device for the production of glass drops from a glass melt contained in a melting furnace and containing radioactive waste.

It has been proposed in DE-OS No. 24 53 404 to transport a radioactive glass melt from a melting furnace in the form of drops and to this end a melting vessel is arranged in a furnace and consists of three pipes arranged coaxially. The liquid glass enters at the base of one of the pipes into a slightly narrower pipe, then rises again in a further pipe, which surrounds the narrower pipe with a clearance, and at the upper pipe has a collar, in which outlet nozzles are constructed in a ring shape, out of which the glass emerges in the form of drops. The glass drops fall onto an endless belt or onto a rotary plate provided with a skimmer and from there into a collecting vessel. This previously proposed device for the production of glass drops is of a very large-scale construction.

It is an object of the present invention to provide a simple device for the production of glass drops from a glass melt containing radioactive waste.

According to the present invention there is provided a device for the production of glass drops from a glass melt contained in a melting furnace and containing radioactive waste, wherein a substantially horizontally extending pipe is adapted at one end to be connected to a melting furnace so as to serve as a glass melt overflow, and wherein the other end of the pipe is equipped or formed with drip nozzles.

By means of the present device, a cumbersome arrangement having several coaxial pipes for the production of glass drops can be dispensed with. In the present device, the glass drops are produced practically directly in the overflow of the melting furnace, and it is possible to make the device a compact structure. The space required is considerably reduced in comparison with conventional devices, which is very advantageous for use in so-called "hot cells". By means of the present device, an integrated melting furnace overflow/glass drop-producing device is created, in which the drip nozzles represent the only outlet path for the glass melt, which substantially facilitates the air seal of the melting furnace and of the drop-producing device.

The present device enables a substantial reduction to be achieved in the quantity of radioactive glass melt present outside the melting furnace (so-called hold-up volume). The hold-up volume only amounts to approximately 1 liter in normal operations with the present device, whereas this volume is substantially higher in the known devices, for example 10 liters. Through this, the safety risk is considerably reduced, since for example if the device is corroded through, only a comparatively small quantity of glass melt can flow out.

In order to enable the invention to be more readily understood, reference will now be made to the accompanying drawings, which illustrate diagrammatically and by way of example some embodiments thereof, in which.

Figure 1:
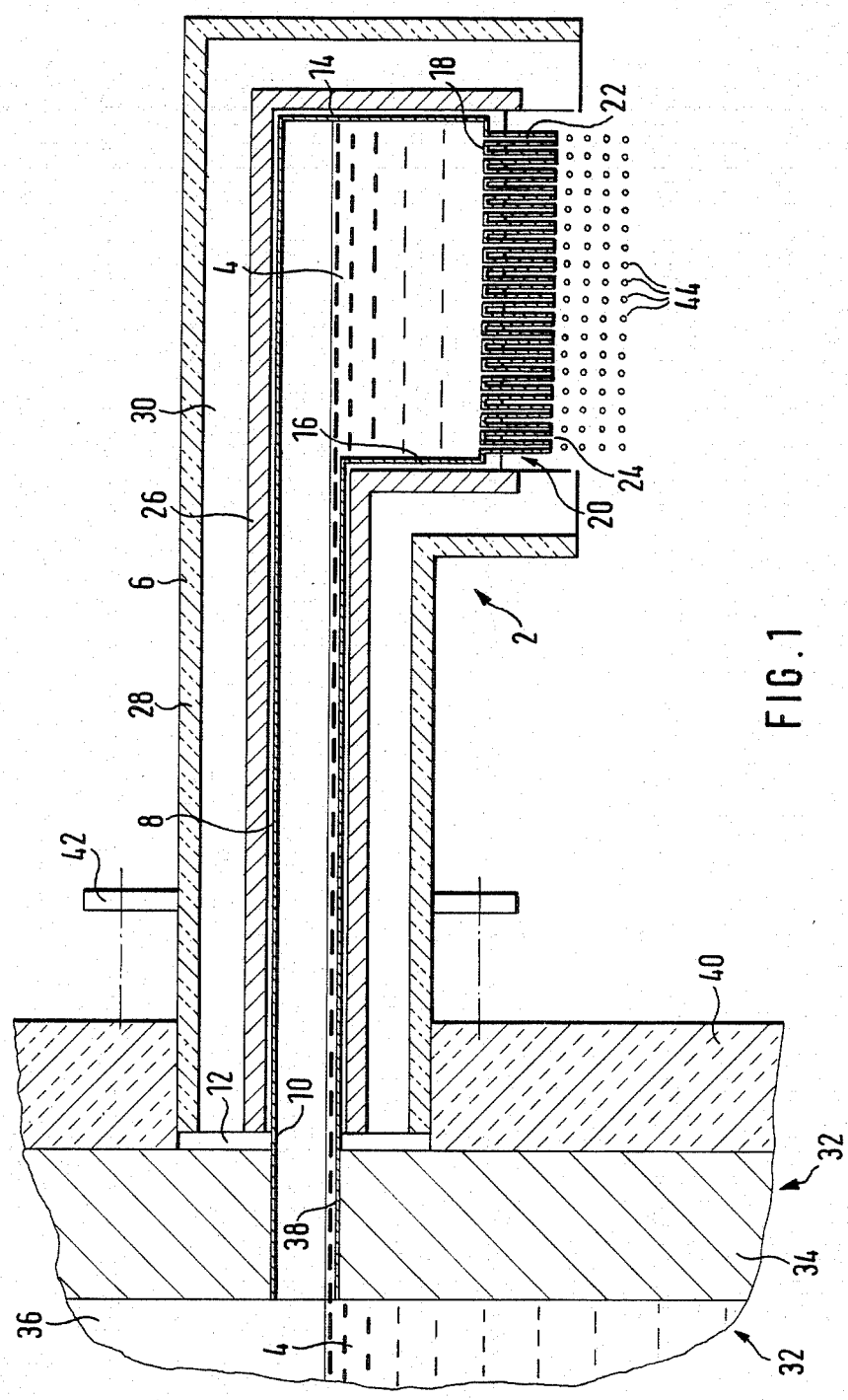
FIG. 1 is a vertical longitudinal section of one embodiment of a device, for the production of glass drops, connected to a melting furnace.

Referring now to FIG. 1 of the drawings, there is shown a device 2 for the production of glass drops from a glass melt 4 contained in a melting furnace 32. The device 2 has a housing 6, which surrounds a horizontally arranged pipe 8, which preferably consists of a metallic material. At one end 10, the pipe 8 is open and is formed or provided with a ring-shaped outer flange 12, which is connected to the housing 6. At the other end 14, the pipe 8 is closed. In the region of the closed end 14, the pipe has a vertically-disposed pocket-like extension or downspout 16, in the base 18 of which numerous small drip nozzles 20 are arranged, each nozzle consisting of a bore 22 formed in the base 18 and a drip pipe 24 mounted in the bore and projecting downwardly.

The pipe 8 is surrounded by heating elements 26 and the housing 6 is provided on its inner side with a heat insulation 28. Between the heat insulation 28 and the heating elements 26 is an intermediate space 30, which at the open end 10 is bridged and sealed by the flange 12.

In order to be able to connect the device 2 to the melting furnace 32, the latter is formed in one wall 34 of its adjoining chamber 36 with a bore 38, the diameter of which corresponds approximately to the internal diameter of the pipe 8. The heat insulation 40 of the melting furnace 32 is removed to accommodate the outside measurement of the device housing 6, so that the device 2 with the flange 12 of the pipe 8 can be brought directly up against the wall 34 and with the aid of a holding device 42 can be fastened to the melting furnace 32.

Figure 2:
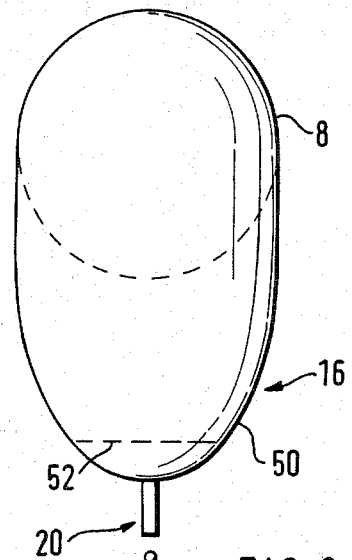
FIG. 2 is an end view of part of the device shown in FIG. 1.

FIG. 2 shows the pocket-like extension or downspout 16 approximately in the form of a dish-shaped pipe piece 50, which joins on tangentially to the mantle of the pipe 8 in the region of a recess of the pipe, indicated by the curved broken line. The drip nozzles 20 are arranged along the bottom closure line of this pipe piece 50, and provide the only outlet from overflow tube 38.

The pipe piece 50 can also be fitted with a flat closure or base 52, as shown in broken line in FIG. 2. The drip nozzles 20 are then preferably distributed over the entire base surface (not shown).

Figure 3:
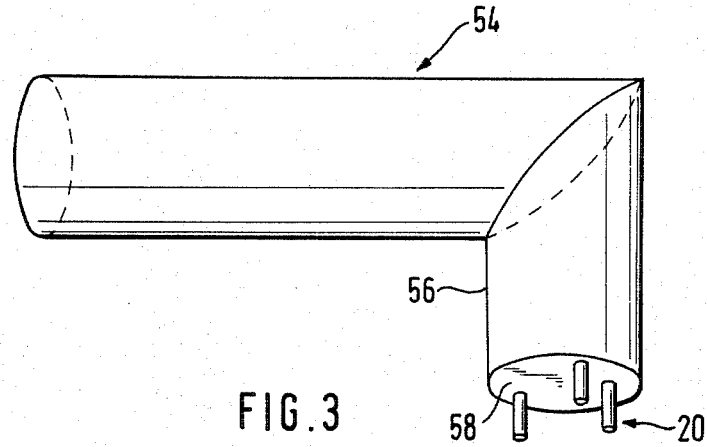
FIG. 3 is a perspective side view of another embodiment of the part shown in FIG. 2.

The pocket-like extension 16 can also have a box shape. FIG. 3 shows an arrangement of the pipe 8 and the pocket-shaped extension 16 as an angluar pipe 54, in which the downspout portion 56 undertakes the function of the pocket-shaped extension 16. The end of downspout 56 is closed with a bottom closure 58, in which the drip nozzles 20, preferably distributed over the whole surface, are arranged.

In the operation of the drop-producing device described above, when the glass level in the ceramic melting furnace 32 reaches the bottom edge of the bore 38 in the adjoining chamber wall 34, the glass melt 4 enters into the open end 10 of the pipe 8 and flows into the pocket-like extension 16, the heating elements 26 maintaining the temperature at a value at which a good flow of the glass melt is guaranteed. The glass melt 4 finally emerges out of the nozzles 20 in the form of drops 44.

The dripping speed is slow in the first instance, when the melt level in the extension 16 is low. The drops 44 are collected with the aid of a known device, for example with the aid of a rotary plate. After the glass level in the pocket-like extension 16 has risen, the dripping speed increases, because the hydrostatic pressure of the glass column onto the nozzle increases. The drip nozzles are constructed such that the glass, on flowing through, fills the entire inner cross-sectional area of the nozzle. This is achieved through limiting the inner diameter of the nozzle to a few millimeters. Through this construction it is guaranteed that the liquid glass constantly emerges out of the nozzles in discrete drops, provided that a certain maximum temperature in the device is maintained.

If the glass level should tend to rise, the drop frequency automatically increases, thereby counteracting a further rise in the glass level.

On short-term rises in level in the adjoining chamber 36, e.g., through pressure surges in the furnace, the level of the glass melt in the pipe 8 in fact also rises; however, the glass melt continues to emerge out of the nozzles 20 in the form of drops. After normalization of the pressure and lowering of the glass level in the adjoining chamber 36 to its standard level, the excess glass melt runs out of the pipe 8 back into the melting furnace 32.

It is therefore ensured that even with upward operational fluctuations in the glass level in the melting furnace, glass drops are always produced. The operating reliability is thereby correspondingly high.

In drop-forming systems for glass melting furnaces, the air seal at the melting furnace presents a particular problem. This seal is improved through the device described above. In the melting furnace, in normal operation, an underpressure (vacuum) of approximately 50 mm. water column is maintained. At a density of the glass melt of approximately 2.5 g/cm$^3$, a glass column of 20 mm. is sufficient to seal the nozzles 20 against this inner under-pressure. Any partially radioactive evaporation products arising in the device described can not arrive in the region of the finished glass beads, i.e., can not emerge out of the drip nozzles.

I claim:

1. A device for producing glass drops from a glass melt containing radioactive waste comprising
   (a) a melting furnace having an opening in the sidewall thereof at the intended melt level;
   (b) a horizontal overflow tube at one end connecting to said opening, and at the other end terminating in a vertically-disposed downspout, said tube being sealed around said opening
   said downspout having a bottom closure; and
   (c) a plurality of drip nozzles mounted in said bottom closure for dispensing drops of glass from said tube, the distance between said nozzles being sufficient to prevent coalescence of said drops
   said nozzles providing the only outlets from said overflow tube.

2. A device as claimed in claim 1, wherein said downspout is formed by a short, dish-shaped pipe piece which joins tangentially to said other end of the overflow tube.

3. A device as claimed in claim 1, wherein the drip nozzles are arranged along the lowest surface line of said bottom closure.

4. A device as claimed in claim 1, wherein said bottom closure is flat, and in which the drip nozzles are arranged and distributed over the entire surface.

5. A device as claimed in claim 1, wherein said downspout is formed by an angled part of the overflow tube.

6. A device as claimed in claim 1, wherein the inner diameter of the drip nozzle is sufficiently small so that molten glass will completely fill the entire inner cross-sectional area, such that the glass melt emerges out of the drip nozzles only in descrete drops.

7. A device as claimed in claim 6 wherein said inner diameter is equal to a few millimeters.

8. A device as claimed in claim 1, wherein said overflow tube is surrounded by a heating device.

9. A device as claimed in claim 8, wherein said overflow tube is enclosed in a heat-insulating housing.

* * * * *